US008937750B2

(12) United States Patent
Ulichney et al.

(10) Patent No.: US 8,937,750 B2
(45) Date of Patent: Jan. 20, 2015

(54) INTER-BLOCK DATA MANAGEMENT

(75) Inventors: Robert Alan Ulichney, Stow, MA (US);
John Ludd Recker, Mountain View, CA
(US); Ingeborg Tastl, San Mateo, CA
(US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/126,571

(22) PCT Filed: Aug. 2, 2011

(86) PCT No.: PCT/US2011/046305
§ 371 (c)(1),
(2), (4) Date: Dec. 16, 2013

(87) PCT Pub. No.: WO2013/019219
PCT Pub. Date: Feb. 7, 2013

(65) Prior Publication Data
US 2014/0132991 A1    May 15, 2014

(51) Int. Cl.
*H04N 1/405*    (2006.01)
*G06K 9/46*    (2006.01)
*G06K 9/48*    (2006.01)
*H04N 19/00*    (2014.01)

(52) U.S. Cl.
CPC .............. *H04N 1/4052* (2013.01); *H04N 7/26* (2013.01)
USPC ........................... 358/3.03; 382/242; 382/243

(58) Field of Classification Search
CPC .............. G06T 9/20; H04N 19/00121; H04N 19/00387; H04N 19/00775; H04N 19/00951; H04N 1/4052; H04N 7/26
USPC .................................. 358/3.03; 382/242, 243
See application file for complete search history.

(56) References Cited

U.S. PATENT DOCUMENTS

| 5,070,413 A | 12/1991 | Sullivan et al. |
| 5,519,791 A | 5/1996 | Webb et al. |
| 5,553,165 A | 9/1996 | Webb et al. |
| 5,710,838 A * | 1/1998 | Jung .............................. 382/242 |
| 5,822,000 A | 10/1998 | Yoon |
| 2005/0013359 A1 | 1/2005 | Srinivasan |
| 2006/0133682 A1 | 6/2006 | Tu et al. |
| 2008/0267291 A1 | 10/2008 | Vieron et al. |

OTHER PUBLICATIONS

Damera-Venkata, Niranjan, et al, "Design and Analysis of Vector Color Error Diffusion Halftoning Systems," IEEE Transactions on Image Processng, vol. 10, No. 10, pp. 1552-1565 Oct. 2001.
Monga, et al., "Image Halftoning by Error Diffusion: A Survey of Methods for Artifact Reduction," retrieved from <<http://citeseerx.ist.peu.edu/viewdoc/download, Sep. 10, 2003.

* cited by examiner

*Primary Examiner* — Charlotte M Baker

(57) ABSTRACT

An exemplary embodiment of the present invention may divide data into a first of set of blocks and a second set of blocks, and data may be stored from non-overlapping frames surrounding the first set of blocks in memory. The data may be grouped from the non-overlapping frames surrounding the second set of blocks, and the data may be absorbed from the non-overlapping frames surrounding the first set of blocks into the second set of blocks. The data may be processed the first set of blocks and the second set of blocks in parallel.

15 Claims, 15 Drawing Sheets

200

400

600

700

800

900

INTER-BLOCK DATA MANAGEMENT

BACKGROUND

Halftoning is a technique that visually renders continuous-tone graphics or images through the arrangement of dots. Error diffusion is a halftoning technique where error may be distributed to nearby pixels that have yet to be processed. Diffusing error allows for source content to be rendered without distortion or visual discontinuities within the image. The error diffused at one location may depend on, in part, the error diffused at another location. As a result, many error diffusion techniques are implemented in a serial fashion.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

An embodiment of the present techniques may include a storage means for inter-block data propagation and conjugate grouping for data transfer among sets of blocks. As used herein, inter-block data propagation may refer to propagating data between blocks in a chessboard arrangement. Further, as discussed below, conjugate grouping may refer to grouping block data. An embodiment of the present techniques may provide a means for absorption of data by the conjugate blocks. Additionally, an embodiment of the present techniques includes compact storage which may mitigate data overload at the corners of some conjugate blocks.

Input data can be processed by parallel halftoning techniques which may process two-dimensional input data arrays by segmenting the array into blocks. These blocks may be arranged in a manner similar to the squares of a chessboard and processed in parallel. Issues may arise when the processing of the first set of blocks results in the propagation of data to the second set of blocks. This type of propagation may occur in error diffusion algorithms. As a result, it is important to effectively manage the processing of inter-block data and the propagation of that data.

Figure 1:
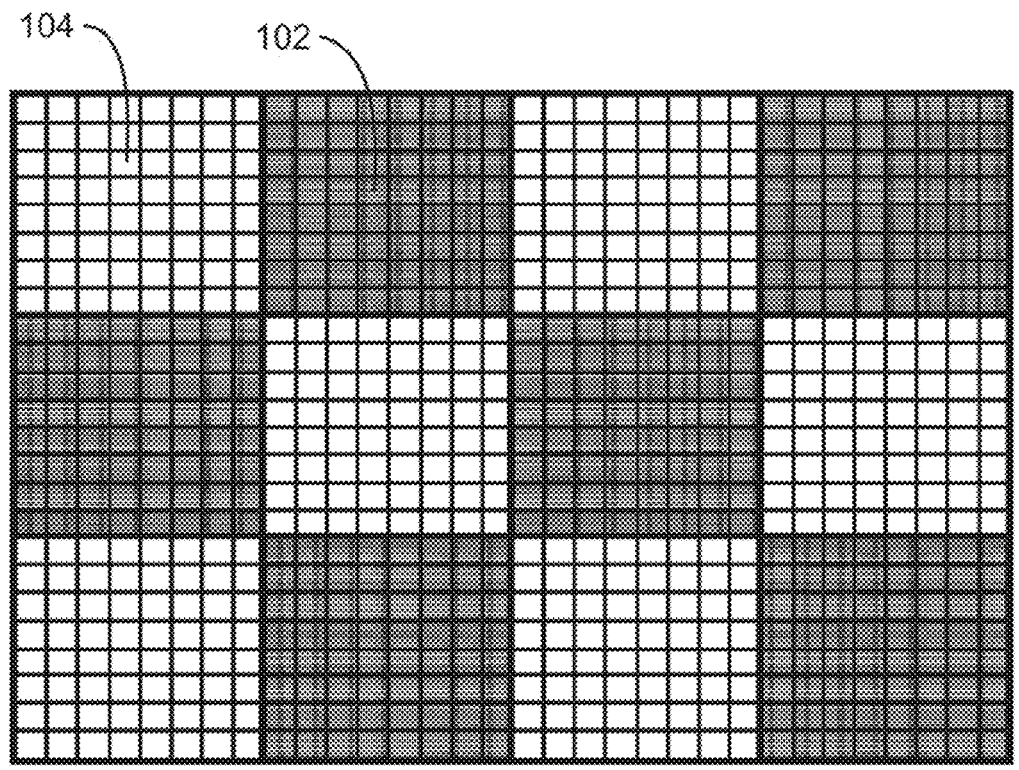
FIG. 1 is a block diagram of a chessboard arrangement having block sizes of 8×8 pixels according to an embodiment of the present techniques.

FIG. 1 is a block diagram of a chessboard arrangement 100 having block sizes of 8×8 pixels according to an embodiment of the present techniques. For ease of description, a first set of blocks may be referred to as white blocks 104, while a second set of blocks may be referred to as gray blocks 102. In this arrangement 100, a pixel corresponds to one square, each block contains sixty-four squares and is an 8×8 block of pixels. Additionally, the gray blocks 102 and white blocks 104 may be processed in parallel.

Figure 2:
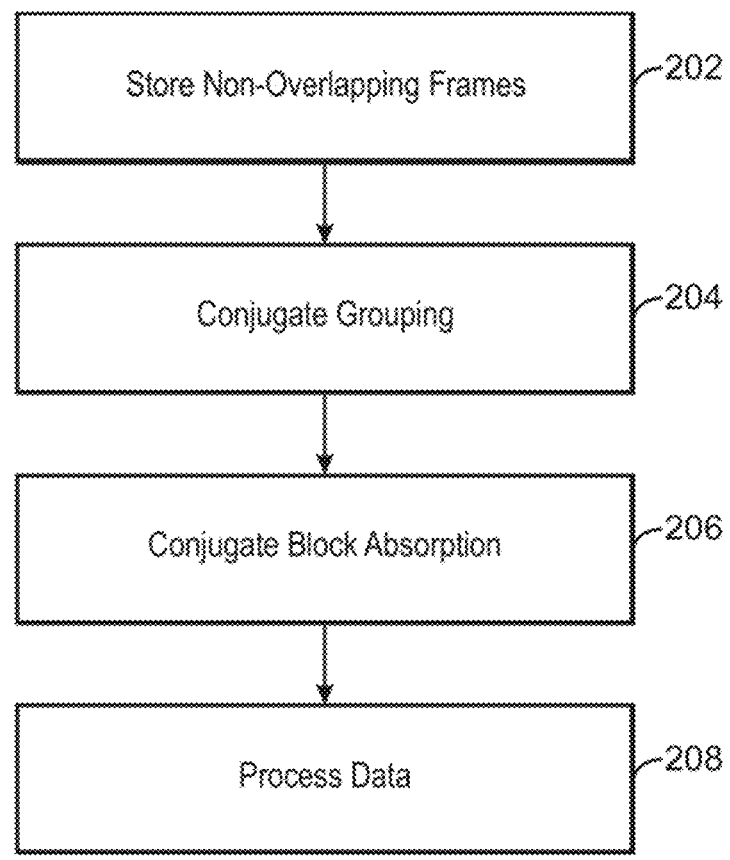
FIG. 2 is a process flow diagram of an overview of a method of inter-block data management according to an embodiment of the present techniques.

FIG. 2 is a process flow diagram 200 of an overview of a method of inter-block data management according to an embodiment of the present techniques. At reference number 202, non-overlapping frames may be stored in memory. A frame may be a set of pixels surrounding the blocks from a first set of blocks. At reference number 204, conjugate grouping occurs. Conjugate grouping may group data from multiple portions of the frames surrounding the second set of blocks. At reference number 206, conjugate block absorption occurs. Conjugate block absorption may absorb the data within the conjugate groups into the second set of blocks, and allow for "zero-corners" to be used, as described herein. At reference number 208, the data within each block in the second set of blocks is processed.

Figure 3:
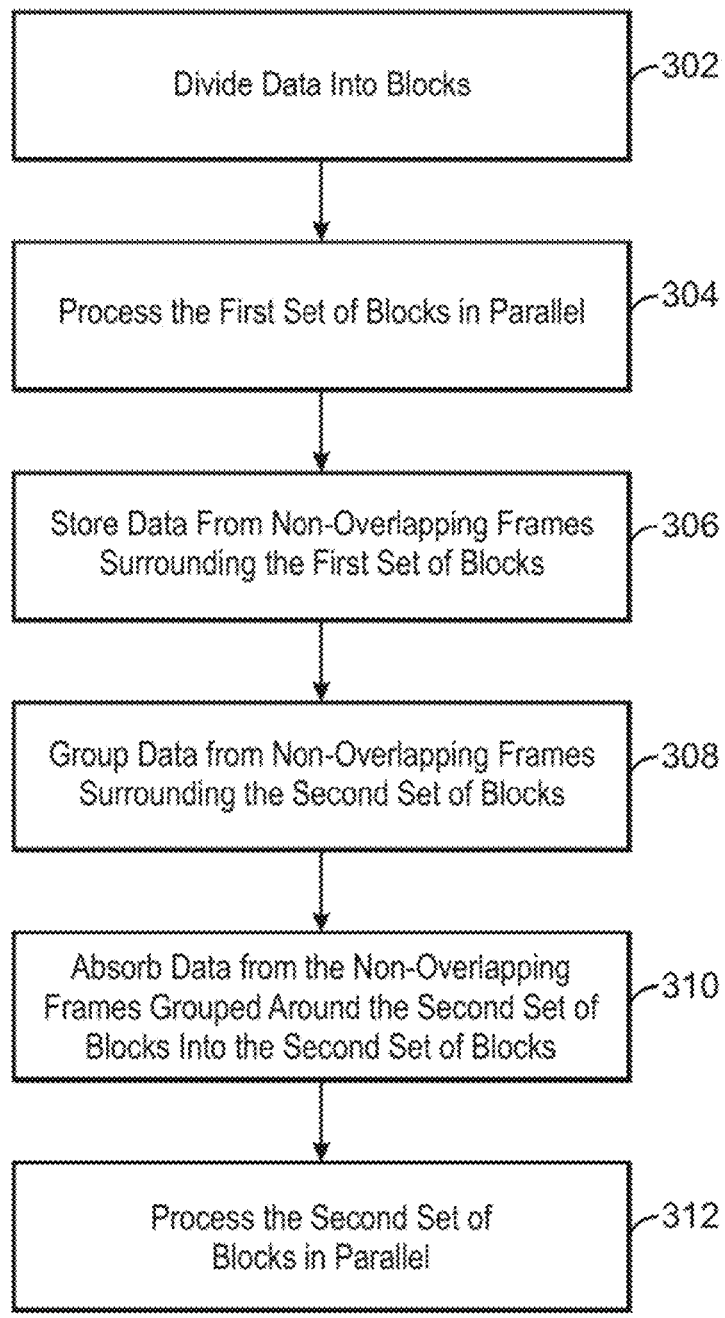
FIG. 3 is a process flow diagram of a method of inter-block data management according to an embodiment of the present techniques.

FIG. 3 is a process flow diagram 300 of a method of inter-block data management according to an embodiment of the present techniques. At reference number 302, data is divided into groups of blocks. The blocks may be separated into two sets according to the chessboard scheme described herein. At reference number 304, data from a first set of blocks is processed in parallel. At reference number 306, data from non-overlapping frames surrounding the first set of blocks may be stored in memory.

At reference number 308, data from the non-overlapping frames may be grouped around a second set of blocks. At reference number 310, the data from the frames grouped around the second set of blocks is absorbed into the second set of blocks. At reference number 312, the data within the second set of blocks may be processed in parallel.

Figure 4:
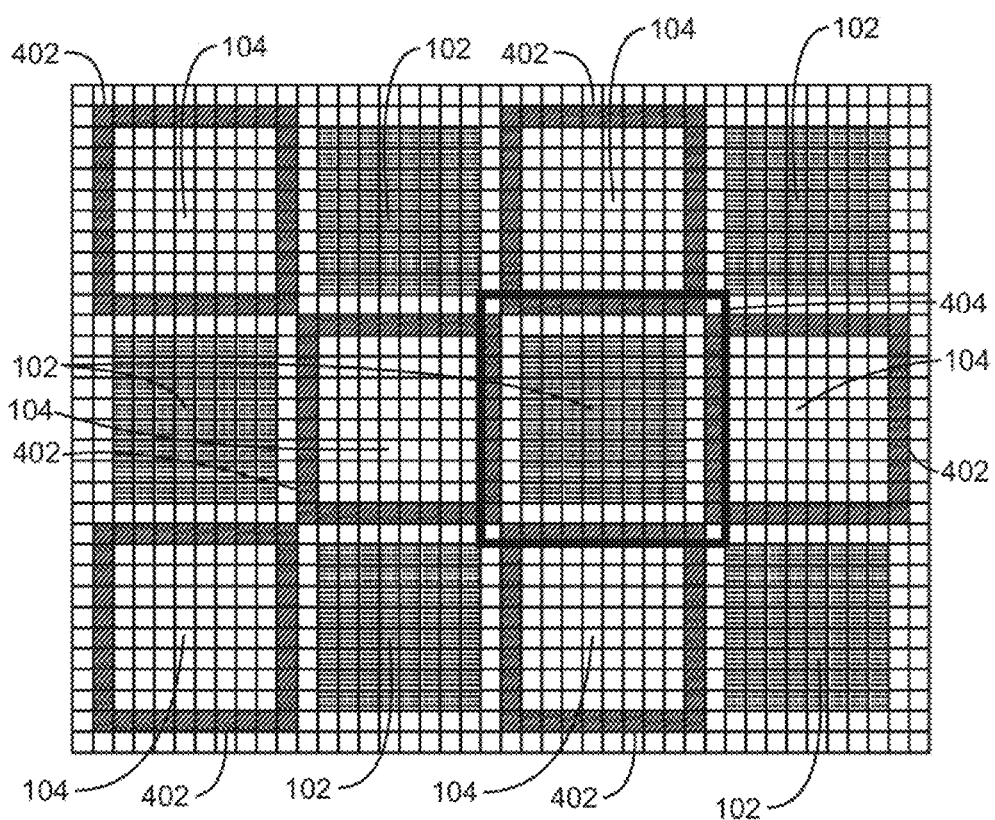
FIG. 4 is a diagram of the storage of diagonal striped frames propagated around white blocks according to an embodiment of the present techniques.

FIG. 4 is a diagram 400 of the storage of diagonal striped frames 402 propagated around white blocks 104 according to an embodiment of the present techniques. For ease of description, the present techniques are described using full blocks of data, where the data being processed is an image of size N by M pixels, with blocks of size n by m pixels.

When non-overlapping frames are stored, as at reference number 202 of FIG. 2 and reference number 306 of FIG. 3, a global storage space may be set up to store the frames of data propagated outside the border of a first set of blocks. These frames may be of size (n+1) by (m+1) pixels. Additionally, to avoid overlap of these frames, the sparse storage space must be of size [N+2(N/n)+2] by [M+2(M/m)+2] pixels.

For example, the 8×8 pixel blocks illustrated in FIG. 1 may have 10×10 pixel frames propagated around the white blocks 104, shown as diagonal striped frames 402 in FIG. 4. Data from surrounding frames may be included in a process referred to herein as conjugate grouping, as described at reference number 204 (FIG. 2) and reference number 308 (FIG. 3). During conjugate grouping, the data in the frames that surround the gray blocks 102 may be composed of data from the portions of the four diagonal striped frames 402 surrounding white blocks 104. A single conjugate group 404 around one of the gray blocks 102 is illustrated in FIG. 4. Conjugate grouping may result in a rectangle block of size (n+4) by (m+4) pixels. For example, conjugate group 404 denotes a conjugate grouping of size 12×12 pixels, and may consist of parts of the diagonal striped frames 402 from four white blocks 104 surrounding the gray block 102 inside of the conjugate group 404.

Figure 5A:
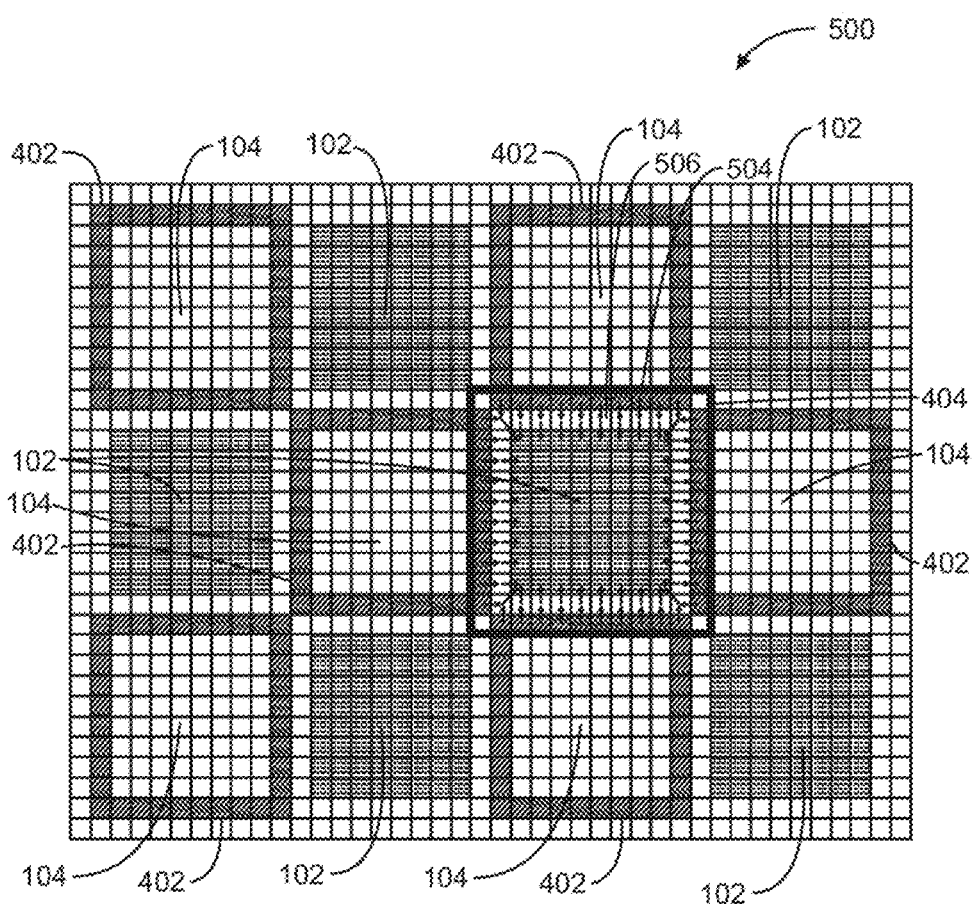
FIG. 5A is a diagram of conjugate block absorption according to an embodiment of the present techniques.

FIG. 5A is a diagram 500 of conjugate block absorption according to an embodiment of the present techniques. A white frame 502 within conjugate group 404 is an intermediate frame into which the portions of the diagonal striped frames 402 within the conjugate group 404 may be absorbed, as described at reference number 206 (FIG. 2), and reference number 310 (FIG. 3).

Figure 5B:
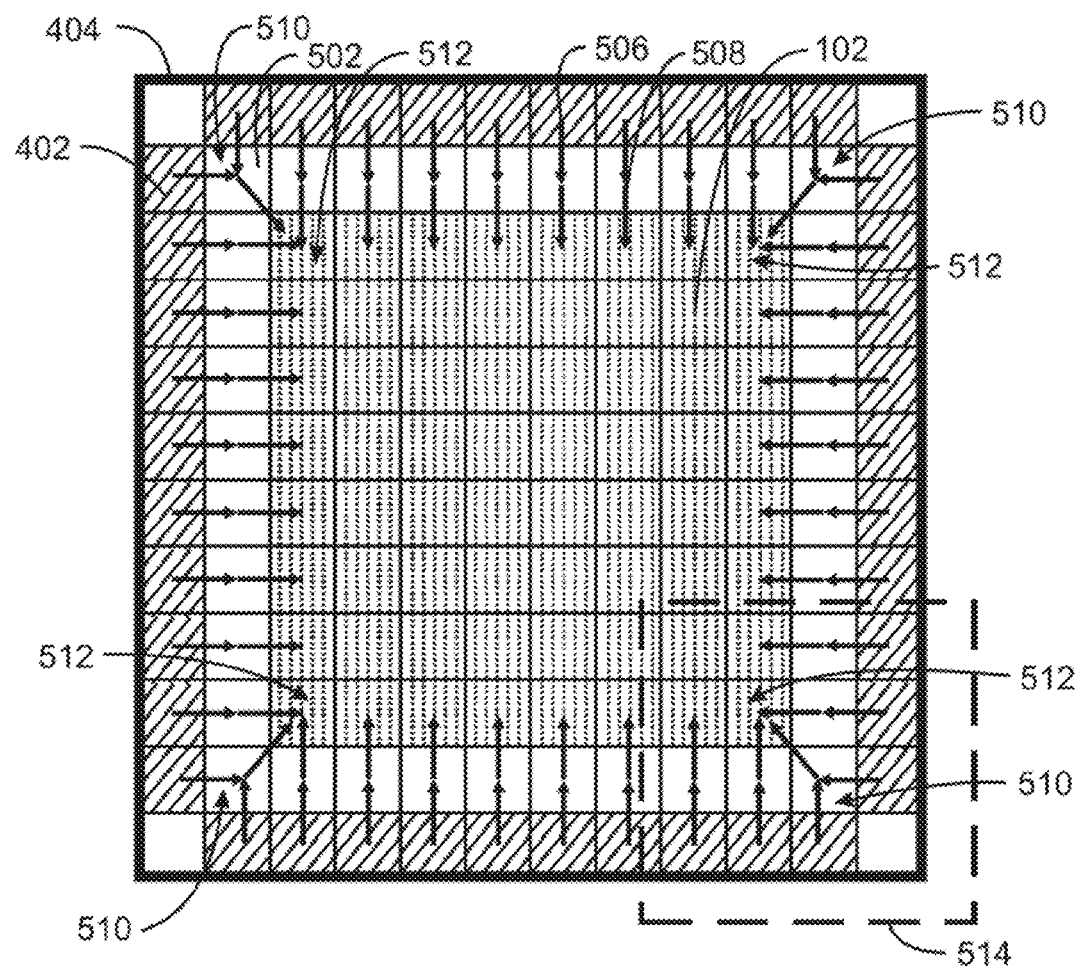
FIG. 5B is a diagram of a larger view of a conjugate group according to an embodiment of the present techniques.

FIG. 5B is a diagram 504 of a larger view of a conjugate group 404 according to an embodiment of the present techniques. For most of the white frame 502, there is a one-to-one pixel correspondence with the diagonal striped frame 402 outside of the intermediate white frame 502. This correspondence may be noted by arrows 506, where each white frame pixel has one arrow from a corresponding diagonal striped frame pixel. Similarly, to propagate the data from the intermediate white frame 502 into the outer pixels of the gray block 102, a similar relationship exists for most pixels where there is a one-to-one relationship. The relationship may be noted by arrows 508 from the intermediate white frame 502 to the gray block 102. However, the four corners 510 of the intermediate white frame 502 have contributions from two diagonal striped frame 402 pixels. This may be shown by the two arrows 506 pointing into each corner 510 of the intermediate white frame 502. Similarly, the corners 512 of the gray block 102 may absorb data from three white pixels, shown by three arrows 508 from the white frame 502.

Figure 5C:
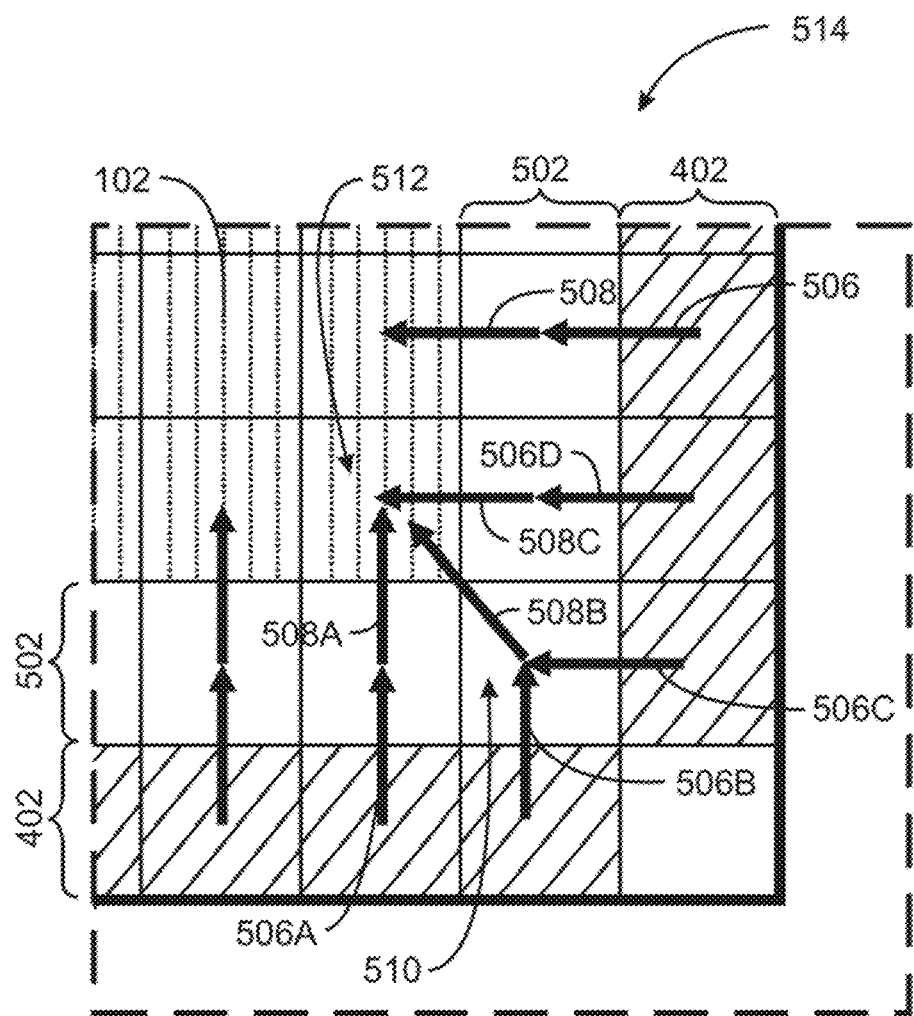
FIG. 5C is a diagram of a larger view of a section of FIG. 5B according to an embodiment of the present techniques.

FIG. 5C is a diagram of a larger view of a section 514 of FIG. 5B according to an embodiment of the present techniques. The pixel at the corner 512 of gray block 102 may absorb data from four striped frame 402 pixels. For example, the pixel at the corner 512 may absorb data from three pixels in the intermediate white frame 502, represented by arrows 508a, 508b, and 508c. The data from the three pixels in the intermediate white frame 502 represented by arrows 508a, 508b, and 508c, may in turn absorb data four pixels in the diagonal striped frame 402, represented by arrows 506a, 506b, 506c, and 506d. Accordingly, the corner 512 of gray block 102 may, in turn, absorb data from four striped frame pixels. This may result in an overload of data propagated into the corner 512 of gray blocks 102. The overloaded propagation of data into the corners of the gray blocks 102 may be mitigated by changing the way data is propagated from the white blocks 104 into the striped frame 402 by using "zero-corners." In zero-corners, the value at the corner of each frame 402 may be set to zero.

Figure 5D:
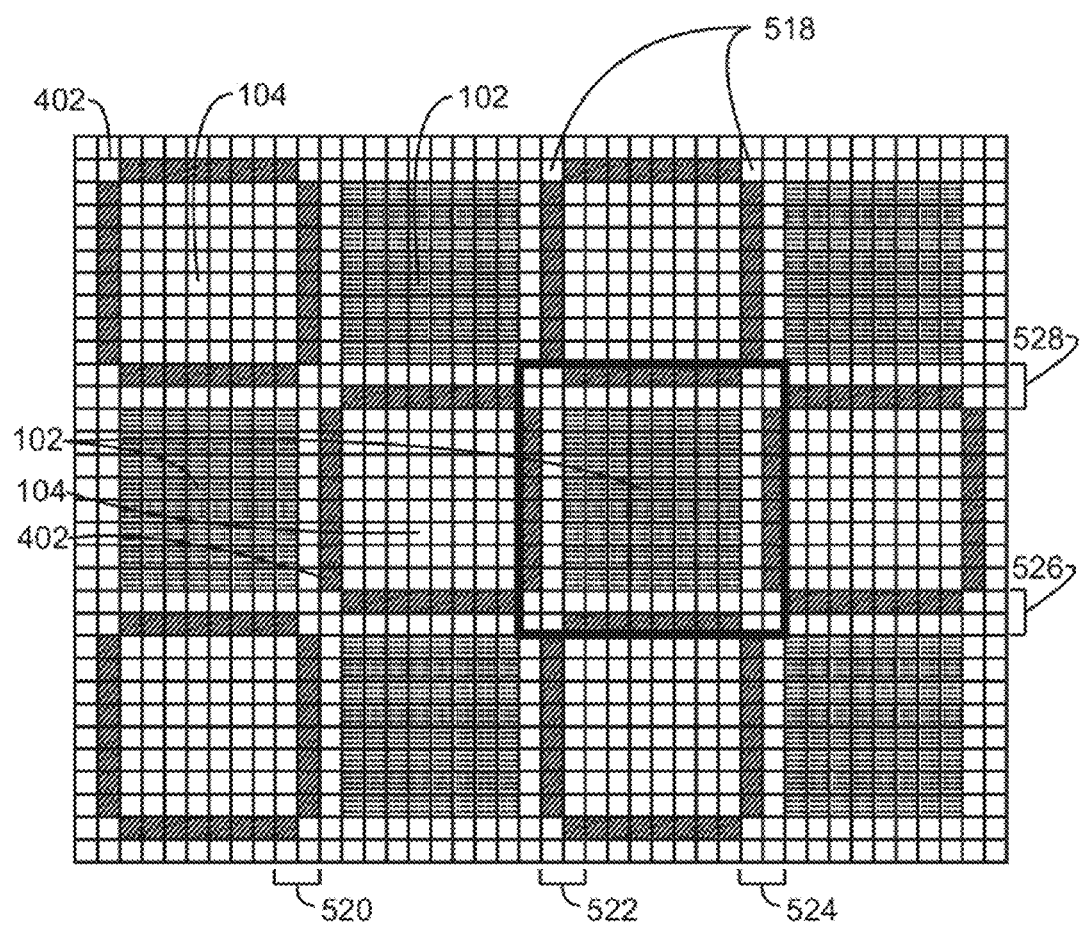
FIG. 5D is a diagram of the storage of diagonal striped frames with zero corners propagated around white blocks according to an embodiment of the present techniques.

FIG. 5D is a diagram 516 of the storage of diagonal striped frames 402 with zero corners propagated around white blocks 104 according to an embodiment of the present techniques. Each corner 518 of a diagonal striped frame 402 has been set to zero, and is no longer striped. As a result, the two pixels between the edges of each diagonal striped frame 402, as shown at reference numbers 520, 522, 524, 526, and 528 may be reduced to one pixel where the edges of each diagonal striped frame 402 are allowed to "overlap" without interference from an adjacent diagonal striped frame 402.

Figure 6A:
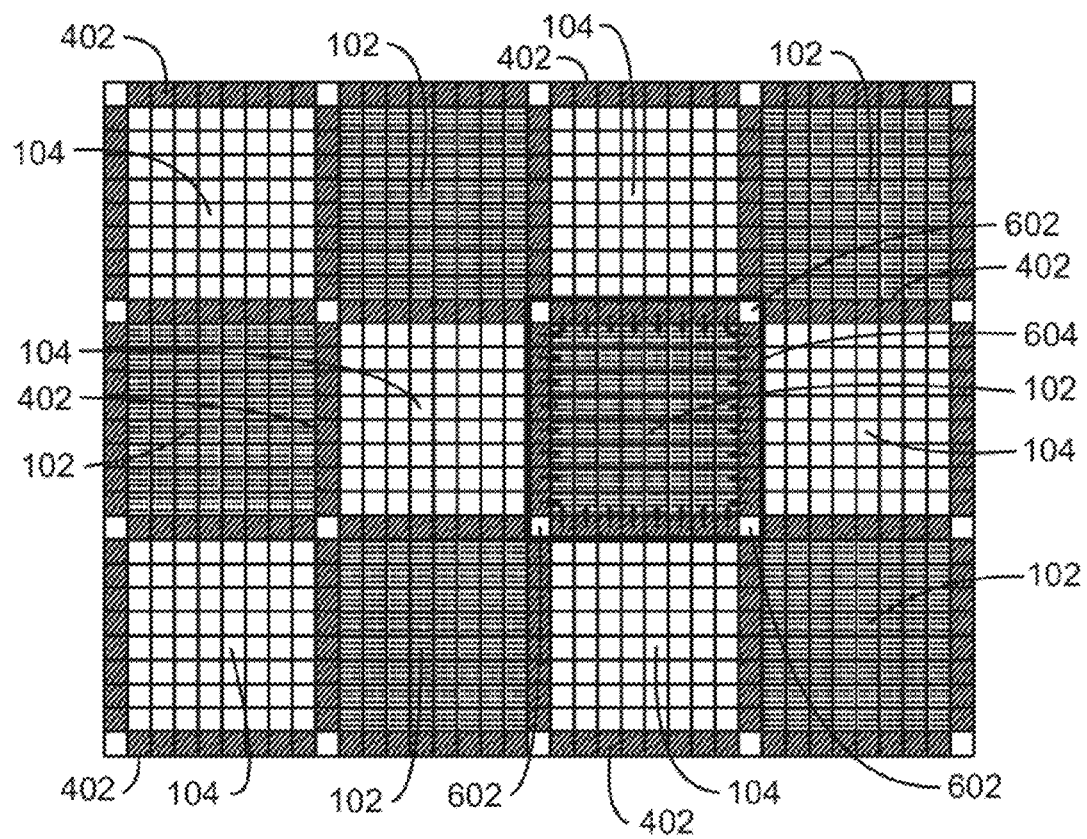
FIG. 6A is a diagram of conjugate block absorption with zero corners according to an embodiment of the present techniques.

FIG. 6A is a diagram 600 of conjugate block absorption with zero corners according to an embodiment of the present techniques. The corners 602 of each striped frame 402 have been set to zero, and are no longer striped. As a result, the propagated data is stored in a compact fashion where one diagonal striped frame 402 overlaps with another diagonal striped frame 402 because neither frame has data in the corners 602. In other words, when compared with the diagonal striped frames 402 in FIG. 5A, the diagonal striped frames 402 of FIG. 6 have corners that have been set equal to zero, and edges that occupy the same row or column of data as an adjacent diagonal striped frame 402. This eliminates the use of an intermediate frame, as shown by the intermediate white frame 502 of FIGS. 5A, 5B, and 5C. Accordingly, the global storage space can now be reduced to size [N+(N/n)+1] by [M 1(M/m)+1] pixels, or 37×28 pixels. Moreover, conjugate grouping may now be a rectangle of size (n+2) by (m+2) pixels. Conjugate block absorption may also be simplified since corners of the gray blocks 102 may now absorb data from two striped frame 402 pixels instead of four striped frame 402 pixels.

Figure 6B:
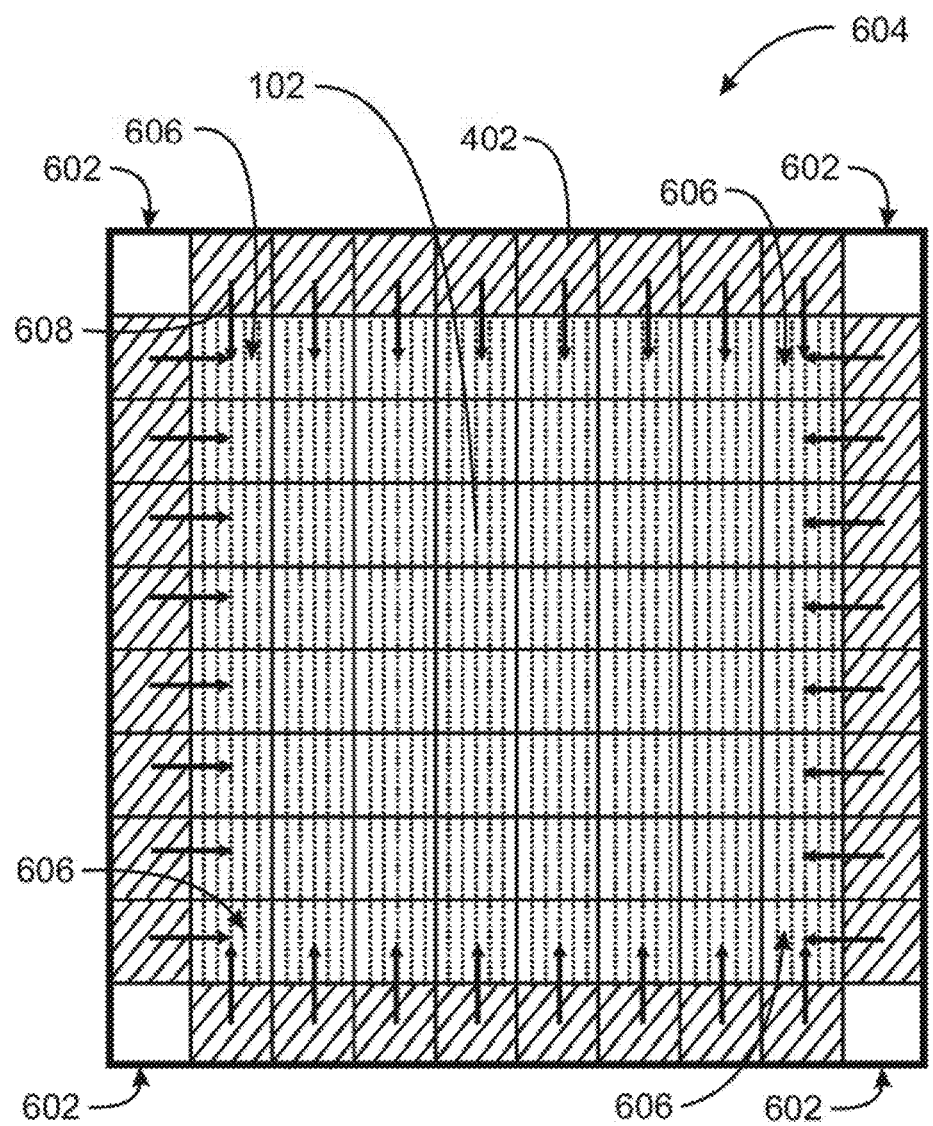
FIG. 6B is a diagram of a larger view of a section of FIG. 6A according to an embodiment of the present techniques.

FIG. 6B is a diagram of a larger view of a section 604 of FIG. 6A according to an embodiment of the present techniques. The corners 606 of gray block 102 absorb data from two striped frame 402 pixels, represented by two arrows 608 at each corner 606. In this manner, the potential data overload from the striped frames 402 is mitigated.

Pinwheel Error Diffusion is a parallel approach to the otherwise sequential error diffusion algorithm that may be used with the inter-block data management techniques described herein. For example, the pixels within white blocks 104 may be processed in the order of an outward spiral, while the pixels in gray blocks may be processed in the order of an inward spiral.

Figure 7:
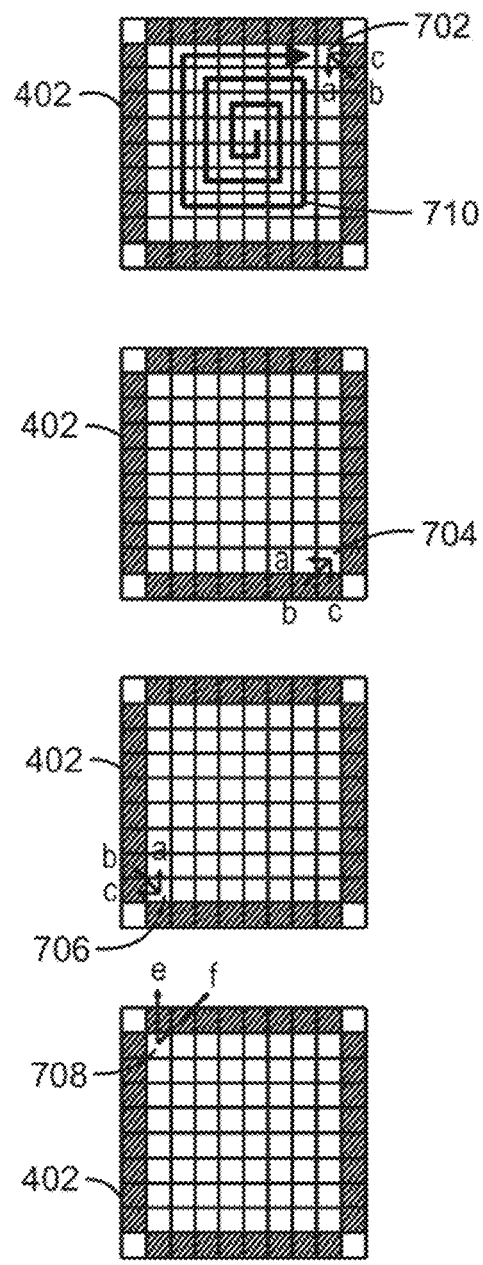
FIG. 7 is a diagram of pinwheel error diffusion applied to zero-corner propagation according to an embodiment of the present techniques.

FIG. 7 is a diagram 700 of pinwheel error diffusion applied to zero-corner propagation according to an embodiment of the present techniques. Special error weight filters may be defined for the final four corners 702, 704, 706, and 708 of the outward spiral 710. The spiral 710 may represent a path of data processing up to the occurrence of the first outer corner 702. Data processing may continue following such a path to the remaining corners 704, 706, and 708.

At corner 702, the error filter may be represented by three weights a, b, and c. This same set of weights may be at corners 704 and 706. Weights a, b, and c at corner 702 reflect the diffusion of error into three pixels. Two pixels are within the diagonal striped frame 402, while the remaining pixel is within the data block as indicated by the directional arrows for weights a, b, and c. Error is diffused in the same manner at corners 704 and 706. Corner 708 may use two weights with values e and f as a result of the diffusion of error into the two remaining pixels within the diagonal striped frame 402, as indicated by the directional arrows for weights e and f. The third pixel within the data block has been previously processed so no error can be diffused into that pixel. Accordingly, corners 702, 704, 706, and 708 may distribute error such that non-zero error may be diffused to the diagonal striped frame 402.

Figure 8:
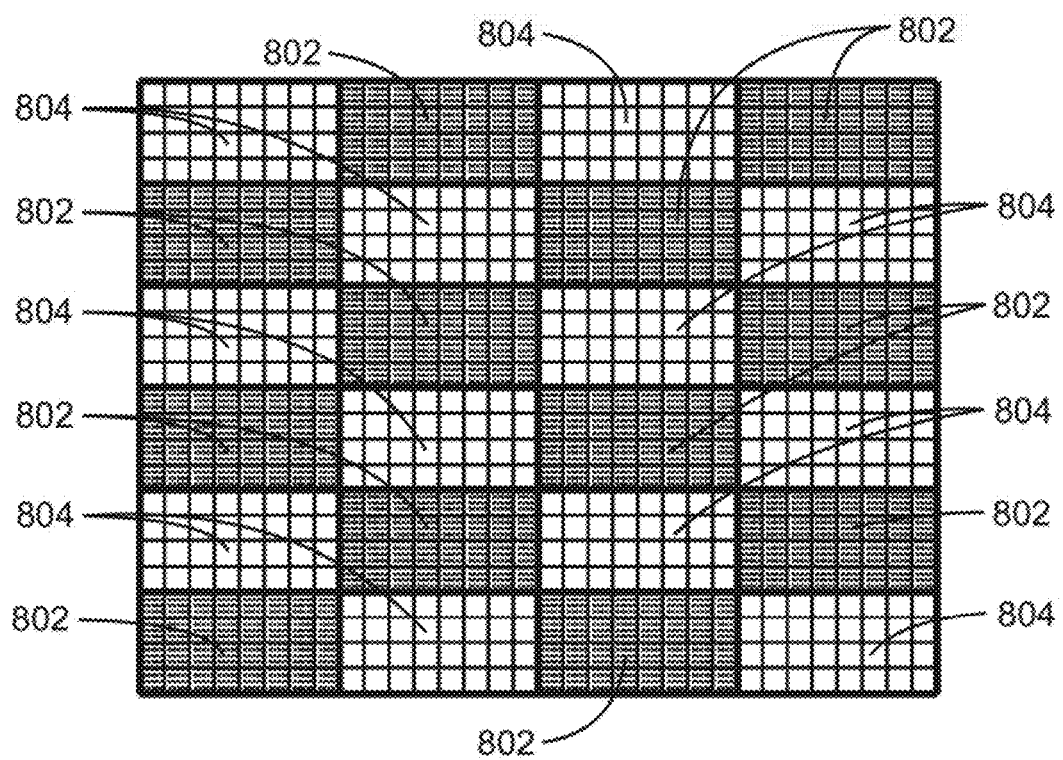
FIG. 8 is a diagram of an alternative block shape according to an embodiment of the present techniques.

FIG. 8 is a diagram 800 of an alternative block shape according to an embodiment of the present techniques. The techniques described herein are not limited to square blocks of pixels as rectangular blocks of any shape and size may be used. For example, diagram 800 shows a rectangular 4×8 blocks with gray blocks 802 and white blocks 804.

Figure 9:
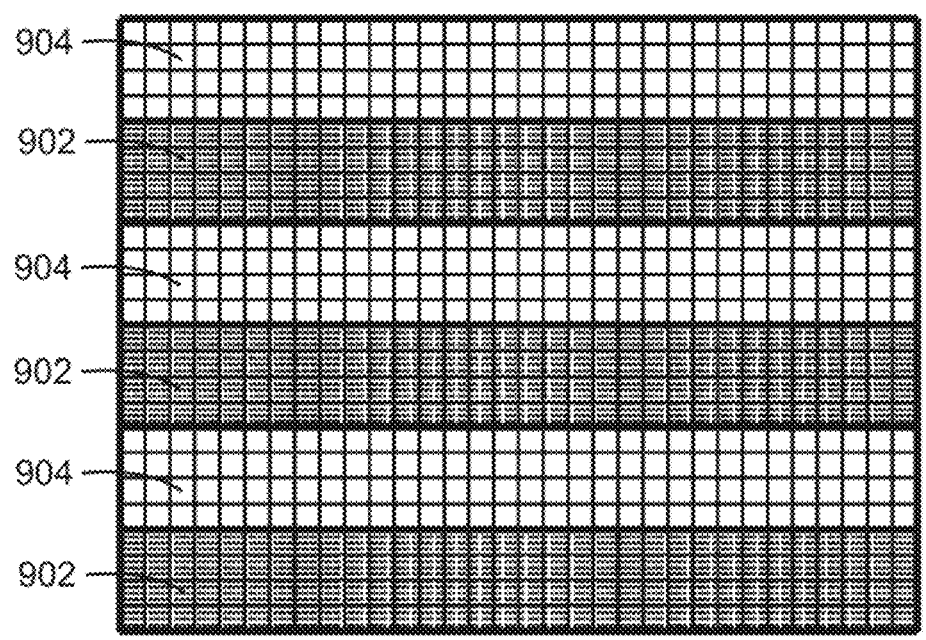
FIG. 9 is a diagram of an alternative block shape according to an embodiment of the present techniques.

FIG. 9 is a diagram 900 of an alternative block shape according to an embodiment of the present techniques. Diagram 900 has gray blocks 902 and white blocks 904 in a striped arrangement.

Using global memory to store frames of propagated data may allow the spatial relationship of the data to be maintained. Conjugate blocks can absorb the inter-block data using a natural addressing scheme, and little or no inter-block process synchronization may be necessary. A common means of communicating information between parallel processes is through a messaging system that may use explicit synchronization or data coherence guarantees. However, the present techniques may use memory writes to an intermediate data buffer as opposed to explicit synchronization or data coherence. Moreover, implementing zero-corners may also reduce global storage, further simplify inter-block data transfer, and mitigate overload on conjugate block corners.

Figure 10:
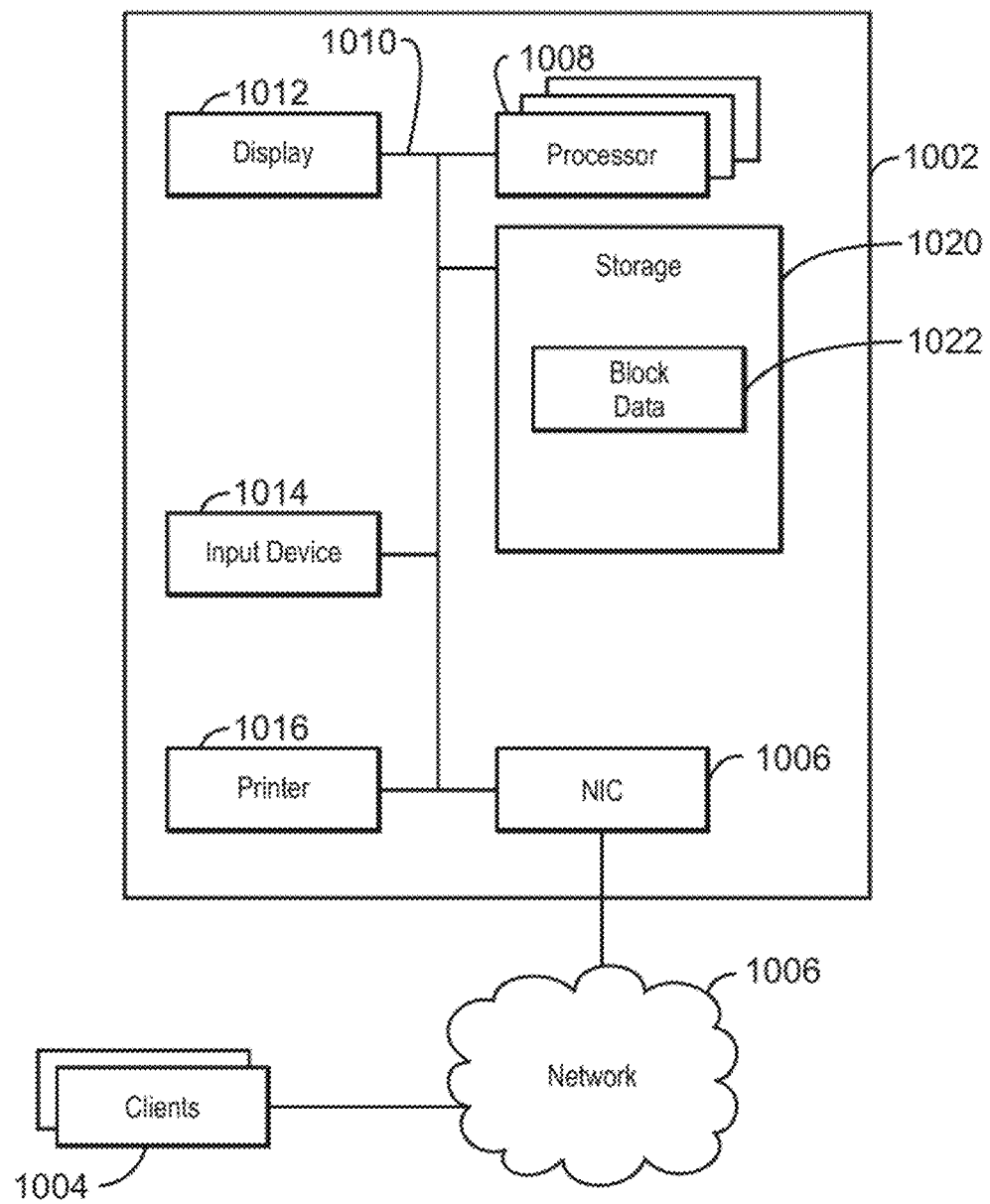
FIG. 10 is a block diagram of a system that may provide a inter-block data management according to an embodiment of the present techniques.

FIG. 10 is a block diagram of a system that may provide inter-block data management. The system is generally referred to by the reference number 1000. Those of ordinary skill in the art will appreciate that the functional blocks and devices shown in FIG. 10 may comprise hardware elements including circuitry, software elements including computer code stored on a tangible, machine-readable medium, or a combination, of both hardware and software elements. Additionally, the functional blocks and devices of the system 1000 are but one example of functional blocks and devices that may be implemented in an embodiment. Those of ordinary skill in the art would readily be able to define specific functional blocks based on design considerations for a particular electronic device.

The system 1000 may include a server 1002, and one or more client computers 1004, in communication over a network 1006. As illustrated in FIG. 10, the server 1002 may include one or more processors 1008 which may be connected through a bus 1010 to a display 1012, one or more input devices 1014, and an output device, such as a printer 1016. The input devices 1014 may include devices such as a mouse or touch screen. When image data is processed using inter-block data management, the image may be rendered using the display 1012 or printer 1016. However, components such as the display 1012 and the input devices may not be present when the server 1002 performs inter-block management. The processors 1008 may include a single core, multiple cores, or a cluster of cores in a cloud computing architecture. The server 1002 may also be connected through the bus 1010 to a network interface card (NIC) 1018. The NIC 1018 may connect the server 1002 to the network 1006.

The network 1006 may be a local area network (LAN), a wide area network (WAN), or another network configuration. The network 1006 may include routers, switches, modems, or any other kind of interface device used for interconnection. The network 1006 may connect to several client computers 1004. Through the network 1006, several client computers 1004 may connect to the server 1002. The client computers 1004 may be similarly structured as the server 1002.

The server 1002 may have other units operatively coupled to the processor 1008 through the bus 1010. These units may include tangible, computer-readable storage media, such as storage 1020. The storage 1020 may include any combinations of hard drives, read-only memory (ROM), random access memory (RAM), RAM drives, flash drives, optical drives, cache memory, and the like. The storage 1020 may include chessboard block data 1022 as used in an embodiment of the present techniques. Additionally, block data 1022 may include data from non-overlapping frames surrounding a set of blocks. Although the block data 1022 is shown to reside on server 1002, a person of ordinary skill in the art would appreciate that the block data 1022 may reside on the server 1002 or any of the client computers 1004.

Figure 11:
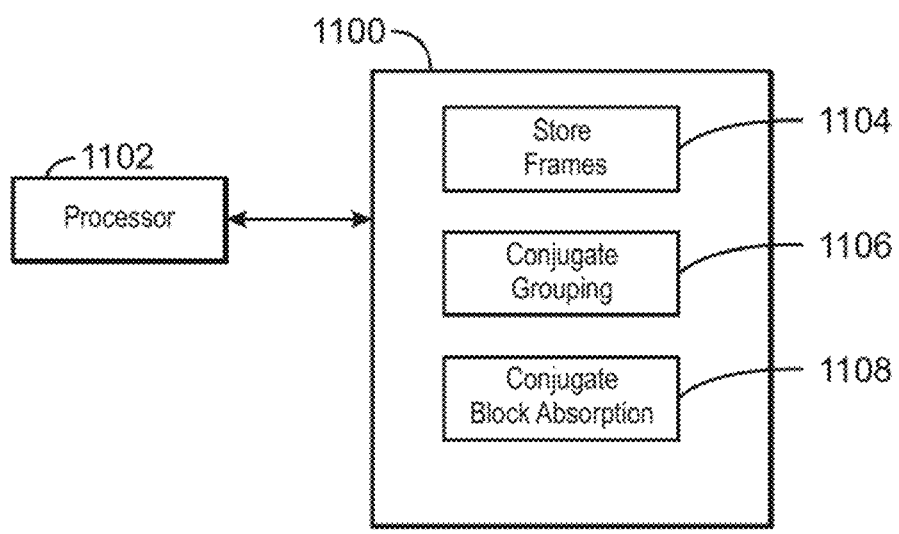
FIG. 11 is a block diagram showing a non-transitory, computer-readable medium that stores code for providing inter-block data management according to an embodiment of the present techniques.

FIG. 11 is a block diagram showing a non-transitory, computer-readable medium that stores code for providing inter-block data management according to an embodiment of the present techniques. The non-transitory, computer-readable medium is generally referred to by the reference number 1100.

The non-transitory, computer-readable medium 1100 may correspond to any typical storage device that stores computer-implemented instructions, such as programming code or the like. For example, the non-transitory, computer-readable medium 1100 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 1102 generally retrieves and executes the computer-implemented instructions stored in the non-transitory, computer-readable medium 1100 for inter-block data management. At block 1104, a storage module may be used to store frames. At block 1106, a conjugate grouping module may be used to perform conjugate grouping. As described herein, conjugate grouping may group data within the frames from one set of blocks. At block 1108, conjugate block absorption module may be used to perform conjugate block absorption. As described herein, conjugate absorption may absorb the data within the frames into the other set of blocks. At block 1110, a processing module may be used to process the data within the first set of blocks and the second set of blocks in parallel.

What is claimed is:

1. A system for inter-block data management, comprising:
a processor that is adapted to execute stored instructions; and
a memory device that stores instructions, the memory device comprising computer-executable code, that when executed by the processor, is adapted to:
divide data into a first set of blocks and a second set of blocks;
place data from non-overlapping frames surrounding the first set of blocks in storage;
group data from the non-overlapping frames surrounding the second set of blocks;
absorb the data from the non-overlapping frames surrounding the first set of blocks into the second set of blocks; and
process the data within the first set of blocks and the second set of blocks in parallel.

2. The system recited in claim 1, wherein data in the corners of the non-overlapping frames is zero.

3. The system recited in claim 2, wherein the memory device comprising computer-executable code that when executed by the processor is adapted to process the data within the first set of blocks and the second set of blocks in parallel using pinwheel error diffusion with error weight filters.

4. The system recited in claim 1, wherein the memory device comprising computer-executable code that when executed by the processor is adapted to process the data within the first set of blocks and the second set of blocks in parallel using a printer or using different processors, including, but not limited to, parallel processors, graphics processing units or central processing units.

5. The system recited in claim 1, wherein the first set of blocks and the second set of blocks are of any rectangular size or shape.

6. A method for inter-block data management, comprising:
dividing data into a first set of blocks and a second set of blocks;
storing data from non-overlapping frames surrounding the first set of blocks in memory;
grouping data from the non-overlapping frames surrounding the second set of blocks;
absorbing the data from the non-overlapping frames surrounding the first set of blocks into the second set of blocks; and
processing the data within the first set of blocks and the second set of blocks in parallel.

7. The method recited in claim 6, herein data in the corners of the non-overlapping frames is zero.

8. The method recited in claim 7, wherein processing the data within the first set of blocks and the second set of blocks in parallel comprises using pinwheel error diffusion with error weight filters.

9. The method recited in claim 6, wherein data within the first set of blocks and the second set of blocks is processed in parallel by a printer or on different processors, including, but not limited to, parallel processors, graphics processing units or central processing units.

10. The method recited in claim 6, wherein the first set of blocks and the second set of blocks are of any rectangular size or shape.

11. A non-transitory, computer-readable medium, comprising code configured to direct a processor to:
dividing data into a first set of blocks and a second set of blocks;
storing data from non-overlapping frames surrounding the first set of blocks in memory using a storage module;
grouping data from the non-overlapping frames surrounding the second set of blocks using a conjugate grouping module;
absorbing the data from the non-overlapping frames surrounding the first set of blocks into the second set of blocks using a conjugate block absorption module; and
processing the data within the first set of blocks and the second set of blocks in parallel using a processing module.

12. The non-transitory, computer-readable medium recited in claim 11, wherein data in the corners of the nonoverlapping frames is zero.

13. The non-transitory, computer-readable medium recited in claim 12, wherein processing the data within the first set of blocks and the second set of blocks in parallel using a processing module comprises using pinwheel error diffusion with error weight filters.

14. The non-transitory, computer-readable medium recited in claim 11, wherein data within the first set of blocks and the second set of blocks is processed in parallel using a processing module on a printer or on different processors, including, but not limited to, parallel processors, graphics processing units or central processing units.

15. The non-transitory, computer-readable medium recited in claim 11, wherein the first set of blocks and the second set of blocks are of any rectangular size or shape.

* * * * *

UNITED STATES PATENT AND TRADEMARK OFFICE
CERTIFICATE OF CORRECTION

PATENT NO. : 8,937,750 B2  
APPLICATION NO. : 14/126571  
DATED : January 20, 2015  
INVENTOR(S) : Robert Alan Ulichney et al.

It is certified that error appears in the above-identified patent and that said Letters Patent is hereby corrected as shown below:

In the Claims

In column 7, line 26, in Claim 7, delete "herein" and insert -- wherein --, therefor.

In column 8, line 20, in Claim 12, delete "nonoverlapping" and insert -- non-overlapping --, therefor.

Signed and Sealed this
Second Day of June, 2015

Michelle K. Lee
*Director of the United States Patent and Trademark Office*